(12) United States Patent
Sasaki

(10) Patent No.: US 7,665,513 B2
(45) Date of Patent: Feb. 23, 2010

(54) HEAT EXCHANGER STRUCTURE OF AUTOMATIC TRANSMISSION

(75) Inventor: Kazumichi Sasaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/187,025

(22) Filed: Jul. 22, 2005

(65) Prior Publication Data

US 2006/0060346 A1  Mar. 23, 2006

(30) Foreign Application Priority Data

Aug. 30, 2004  (JP) .............................. 2004-250594

(51) Int. Cl.
 *F01P 11/08* (2006.01)
 *F01P 3/18* (2006.01)
 *F01P 7/16* (2006.01)
 *F16H 57/04* (2006.01)

(52) U.S. Cl. .................. 165/298; 165/297; 165/47; 165/96; 165/100; 165/101; 165/103; 165/140; 165/144; 165/145; 165/916; 123/41.1; 123/41.31; 123/41.33; 123/196 AB; 236/34.5; 236/93 A; 236/99 K; 74/606 A; 74/467; 184/6.12; 184/6.22; 184/104.1

(58) Field of Classification Search ............... 165/297, 165/298, 916, 103, 144, 145, 100, 101, 96, 165/47, 140; 236/34.5, 93 R, 93 A, 99 K; 123/41.31, 196 AB, 41.1, 41.33; 74/467, 74/606 A; 184/6.12, 6.22, 104.1
See application file for complete search history.

(56) References Cited

U.S. PATENT DOCUMENTS

| | | | | |
|---|---|---|---|---|
| 2,374,639 | A * | 4/1945 | Miller | 165/297 |
| 3,255,740 | A * | 6/1966 | Walsh | 236/34.5 |
| 5,024,377 | A | 6/1991 | Harrison | |
| 6,253,837 | B1 * | 7/2001 | Seiler et al. | 165/297 |
| 6,427,640 | B1 * | 8/2002 | Hickey et al. | 123/41.31 |
| 6,499,666 | B1 * | 12/2002 | Brown | 236/34.5 |
| 6,527,046 | B1 * | 3/2003 | White | 165/297 |
| 6,575,707 | B2 * | 6/2003 | Matt et al. | 165/297 |
| 6,830,527 | B2 * | 12/2004 | Wakayama | 165/916 |
| 2003/0116105 | A1 * | 6/2003 | Pfeffinger et al. | 123/41.31 |

FOREIGN PATENT DOCUMENTS

JP  A 11-264318  9/1999
JP  A-2000-046156  2/2000

* cited by examiner

*Primary Examiner*—John K Ford
(74) *Attorney, Agent, or Firm*—Oliff & Berridge, PLC

(57) ABSTRACT

A heat exchanger structure of an automatic transmission stabilizing a temperature of oil is provided. A heat exchanger structure of an automatic transmission includes an automatic transmission, a first heat exchanger provided on an upstream side and a second heat exchanger provided on a downstream side, each capable of cooling oil ejected from the automatic transmission, and a thermo valve capable of supplying oil subject to heat exchange by at least one of first and second heat exchangers to the automatic transmission. When a temperature of the oil is relatively low, the thermo valve supplies oil passed through the first heat exchanger to the automatic transmission and shuts off a flow of oil from the second heat exchanger to the automatic transmission. When a temperature of the oil is relatively high, the thermo valve supplies oil passed through first and second heat exchangers to the automatic transmission.

11 Claims, 6 Drawing Sheets

HEAT EXCHANGER STRUCTURE OF AUTOMATIC TRANSMISSION

This nonprovisional application is based on Japanese Patent Application No. 2004-250594 filed with the Japan Patent Office on Aug. 30, 2004, the entire contents of which are hereby incorporated by reference.

BACKGROUND OF THE INVENTION

1. Field of the Invention

The present invention relates to a heat exchanger structure of an automatic transmission and, more specifically, to a heat exchanger structure of an automatic transmission which can stabilize a temperature of oil.

2. Description of the Background Art

A conventional heat exchanger structure of an automatic transmission is disclosed in, for example, Japanese Patent Laying-Open No. 11-264318 (a patent document 1).

Patent document 1 discloses a structure including two heat exchangers, in which a heat exchange path of oil is switched based on a temperature of oil.

Switching of a switching valve (thermo valve) in a conventional technique is controlled with a temperature of oil subject to heat exchange by a first heat exchanger. The oil actually flowing into a transmission, however, may be subject to heat exchange by a second heat exchanger. Therefore, control of switching of the valve based on a temperature of the oil flowing into the transmission may not be possible.

The conventional heat exchanger structure described above has a problem that a temperature of oil cannot be stabilized readily.

SUMMARY OF THE INVENTION

The present invention is made to solve the problem as described above. An object of the present invention is to provide a heat exchanger structure of an automatic transmission which can stabilize a temperature of oil.

A heat exchanger structure of an automatic transmission according to an aspect of the present invention includes an automatic transmission, a first heat exchanger provided on an upstream side and a second heat exchanger provided on a downstream side, each capable of exchanging heat of oil ejected from the automatic transmission, and a thermo valve capable of supplying oil subject to heat exchange by at least one of the first and second heat exchangers to the automatic transmission. When a temperature of the oil is at most a predetermined value, the thermo valve supplies oil passed through the first heat exchanger to the automatic transmission and shuts off a flow of the oil from the second heat exchanger to the automatic transmission. When a temperature of the oil exceeds the predetermined value, the thermo valve supplies oil passed through the first and second heat exchangers to the automatic transmission.

In the heat exchanger structure of an automatic transmission constructed as such, when a temperature of the oil is at most the predetermined value, the thermo valve supplies oil passed through the first heat exchanger to the automatic transmission and shuts off the flow of the oil from the second heat exchanger to the automatic transmission. With this, as an operation of the second heat exchanger is stopped at a low temperature, heat radiation from the oil is prevented and the temperature of the oil can be increased rapidly. In addition, when the temperature of the oil exceeds the predetermined value, the thermo valve supplies oil passed through the first and second heat exchangers to the automatic transmission. Therefore, the oil can be sufficiently cooled with the first and second heat exchangers and the oil can be prevented from becoming a high temperature. As a result, the temperature of the oil can be stabilized.

Preferably, the thermo valve shuts off a flow of the oil from the second heat exchanger toward the thermo valve when a temperature of the oil is at most the predetermined value, and shuts off a flow of the oil from the first heat exchanger toward the thermo valve when a temperature of the oil exceeds the predetermined value.

A heat exchanger structure of an automatic transmission according to another aspect of the present invention includes an automatic transmission, a first heat exchanger provided on an upstream side and a second heat exchanger provided on a downstream side, each capable of exchanging heat of oil ejected from the automatic transmission, and a thermo valve capable of supplying oil subject to heat exchange by at least one of the first and second heat exchangers to the automatic transmission, wherein the oil ejected from the thermo valve is supplied to the automatic transmission without being cooled with the heat exchanger.

In the heat exchanger structure of an automatic transmission constructed as such, since the oil ejected from the thermo valve is supplied to the automatic transmission without being cooled with the heat exchanger, the thermo valve is arranged on an inlet side of the automatic transmission and a temperature of the oil is controlled with the thermo valve. That is, by controlling the temperature of the oil at an inlet of the automatic transmission with the thermo valve, the first and second heat exchanger can be appropriately selected to keep a constant oil temperature. As a result, an undershoot or an overshoot of an oil temperature becomes smaller as compared with an arrangement of the thermo valve to control an oil temperature at an outlet, and thus a delay in response can be avoided. As a result, a heat exchanger structure of an automatic transmission with a stable oil temperature can be provided.

According to the present invention, a heat exchanger structure of an automatic transmission with a stable oil temperature can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
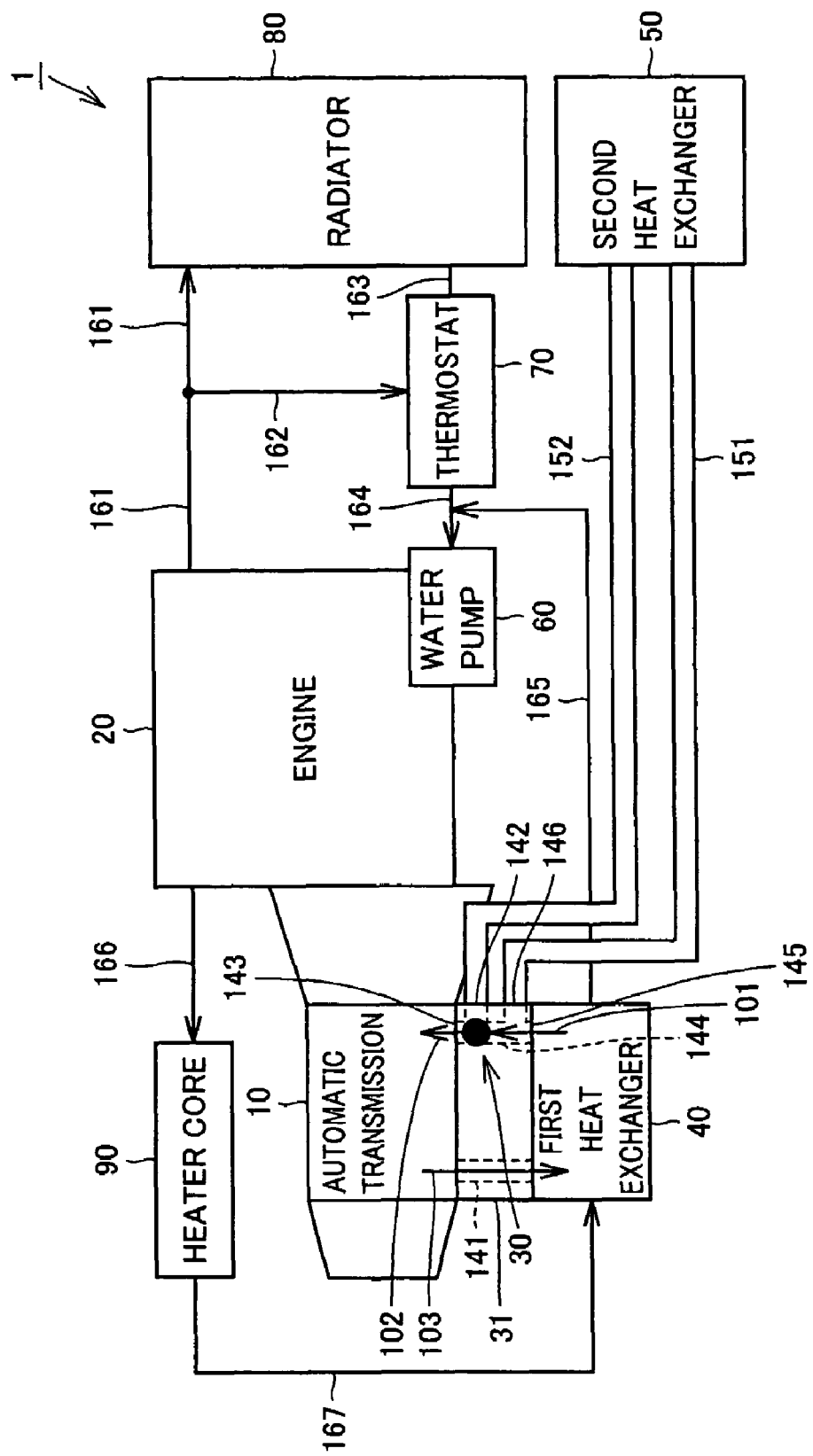
FIG. 1 is a block diagram of a heat exchanger structure of an automatic transmission according to a first embodiment of the present invention.

Embodiments of the present invention will now be described referring to the drawings. In the following embodiments, the same or corresponding portions are indicated with the same reference characters, and descriptions thereof will not be repeated.

First Embodiment

Referring to FIG. 1, a heat exchanger structure 1 of an automatic transmission according to a first embodiment of the present invention includes an engine 20 for generating power and an automatic transmission 10 which can receive the power from engine 20 and convert a rotation number and a rotational torque of the power. Engine 20 is a source of power, which can be a gasoline engine or a diesel engine. In addition, engine 20 can be formed not only with an internal combustion engine but also with an external combustion engine. Engine 20 can further be formed with a motor/generator.

Rotational force output from engine 20 is converted with automatic transmission 10. A structure using a torque converter and a planet gear can be adopted as automatic transmission 10. Automatic transmission 10 is not limited to this, and a continuously variable transmission can also be adopted. Automatic transmission 10 can also be formed with a transmission having a plurality of constant mesh gears or selective sliding gears, engagement of which gears is automatically changed.

Automatic transmission 10 has oil for smoothing an internal structure and transmitting power.

A thermo valve 30 is attached to automatic transmission 10. More specifically, a thermo valve case 31 as a body is attached to an external portion of automatic transmission 10, and thermo valve 30 is embedded in thermo valve case 31. Thermo valve 30 has a function of switching of an oil passage.

A first heat exchanger 40 is attached to thermo valve case 31. First heat exchanger 40 exchanges heat between cooling water passing through a heater core 90 and oil (fluid for automatic transmission) of automatic transmission 10. Heater core 90 is connected to first heat exchanger 40 with a cooling water passage 167, and the cooling water transfers heat to first heat exchanger 40 via heater core 90.

Heat from engine 20 is supplied through a cooling water passage 166 to heater core 90. Heater core 90 is provided in an interior of a car and transmits heat from engine 20 to the inside of the car. With this, the inside of the car can be heated. Heater core 90 may be formed on a cooling water passage 165 for heat exchange with the oil of automatic transmission 10. Heater core 90 may not be provided on a cooling water passage for heat exchange with the oil of automatic transmission 10, and cooling water passages 166 and 167 may be directly connected to each other. A water pump 60 is attached to engine 20. Water pump 60 is a pump for supplying cooling water into engine 20, and is arranged at an inlet of the cooling water. A thermostat 70 and a radiator 80 are connected to an upstream side of water pump 60. Thermostat 70 adjusts an amount of heat radiation with radiator 80 according to a temperature of cooling water (long-life coolant) cooling engine 20. More specifically, when a temperature of engine 20 is low, thermostat 70 decreases an amount of flow of water passing through radiator 80. With this, the amount of heat radiation with radiator 80 is decreased and thereby the temperature of engine 20 is increased. On the contrary, when a temperature of engine 20 becomes high, thermostat 70 increases the amount of flow of cooling water passing through radiator 80. With this, much heat generated in engine 20 can be radiated with radiator 80, and thereby the temperature of engine 20 is decreased. Engine 20, radiator 80, thermostat 70, water pump 60, and first heat exchanger 40 are connected to each other with cooling water passages 161, 162, 163, 164, and 165.

An overall flow of cooling water is as follows. Cooling water introduced from water pump 60 into a lower portion of engine 20 is ejected from a head portion of engine 20 divided into two paths. In one path, cooling water passes through cooling water passage 161 and flows into radiator 80. The cooling water flowing into radiator 80 then travels from radiator 80 through cooling water passage 163, thermostat 70, cooling water passage 164, and returns to water pump 60. A portion of the cooling water flows into cooling water passage 162 divided from cooling water passage 161, which bypasses radiator 80 and directly reaches thermostat 70.

The cooling water which is ejected from engine 20 but not flows into cooling water passage 161 flows through cooling water passage 166 into heater core 90. Heat is radiated inside the car at heater core 90, and the cooling water further flows through cooling water passage 167 into first heat exchanger 40. Heat is exchanged between the cooling water and oil by first heat exchanger 40, and then the cooling water flows through cooling water passage 165 to return to water pump 60.

Next, a path of oil flowing through automatic transmission 10 will be described. As shown in FIG. 1, oil passing through automatic transmission 10 is ejected in a direction indicated with an arrow 103. In this step, the oil flows through a passage 141 in thermo valve case 31 into first heat exchanger 40. The oil which has exchanged heat with the cooling water in first heat exchanger 40 flows in a direction indicated with an arrow 101. In this step, the oil passes input ports 145 and 144. Thermo valve 30 receives the oil from first heat exchanger 40 and returns the oil to automatic transmission 10. When a temperature is low, thermo valve 30 does not supply the oil to a second heat exchanger 50. Second heat exchanger 50 and thermo valve 30 are connected to each other with oil passages 151 and 152.

Figure 2:
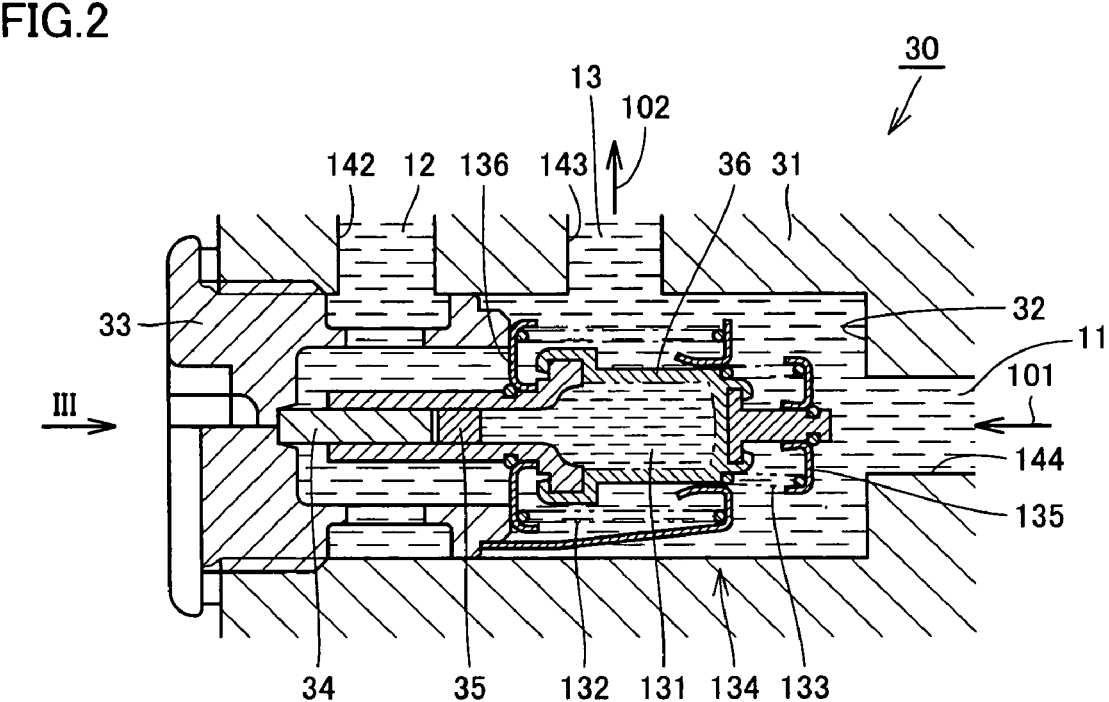
FIG. 2 is a detailed cross-sectional view of a thermo valve shown in FIG. 1.

Referring to FIG. 2, thermo valve 30 has thermo valve case 31, an internal space 32 provided in thermo valve case 31 to be an oil passage, a lid 33 for sealing internal space 32, a thermo element shaft 34 having a portion engaging with lid 33, a packing 35 contacting with thermo element shaft 34, and a thermo element 134 for pushing up thermo element shaft 34.

Thermo element 134 has a structure in which a cylinder 36 encloses wax 131 therein, and wax 131 contacts with packing 35 which can move in a direction of an axis. Wax 131 (for example, paraffin wax) expands corresponding to a temperature of oil 11. With this, a position of packing 35 changes. Accordingly, packing 35 slides relative to cylinder 36.

Thermo element 134 is positioned relative to lid 33 with a return spring 132. Return spring 132 contacts with a high temperature port 136 which is an input port. In a state shown in FIG. 2, high temperature port 136 blocks a flow of oil 12 from an input port 142. A low temperature port 135 as an input port valve is provided on an end portion of a rear side of cylinder 36. Low temperature port 135 can seal an input port 144. In the state shown in FIG. 2, low temperature port 135 is not sealing input port 144. Therefore, oil 11 is introduced from input port 144 as indicated with arrow 101, and is ejected from an output port 143. A valve spring 133 is provided between low temperature port 135 and cylinder 36.

Thermo element 134 encloses wax 131 therein and has a peripheral portion contacting with oil 11. Wax 131 expands when a temperature of oil 11 becomes high.

At a high temperature, wax 131 expands and thermo element shaft 34 protrudes from cylinder 36. With this, an amount of a valve stroke of each of high temperature port 136 and low temperature port 135 can be controlled to limit a flow amount to each output port.

Low temperature port 135 as a first input port valve, which is interlocked with thermo element 134, opens when a temperature of the oil is low and closes when the temperature is high. With this, a flow amount of oil from first heat exchanger 40 is controlled.

High temperature port 136 as a second input port valve is an inlet of a fluid which controls a flow amount of oil according to a temperature. High temperature port 136, which is interlocked with thermo element 134, closes at a low temperature and opens at a high temperature to control a flow amount of oil 12 passing through first heat exchanger 40 and ejected from second heat exchanger 50.

Output port 143 is an outlet of oil 13 having a flow amount controlled according to a temperature. When an oil temperature is low, oil 11 passing through first heat exchanger 40 is ejected from output port 143 according to a stroke position of thermo element 134. When the oil has a middle temperature, oil 11 from first heat exchanger 40 and oil 12 which passed through heat exchanger 40 and was cooled with second heat exchanger 50 are ejected from output port 143. When the oil temperature is high, the oil passed through heat exchanger 40 and was cooled with second heat exchanger 50 is ejected from output port 143.

Valve spring 133 applies a load to low temperature port 135 to absorb an overload applied to thermo element 134 due to an overstroke after low temperature port 135 has closed when a temperature of the oil is high.

At a low temperature, return spring 132 applies loads to high temperature port 136 and thermo element 134 to receive thermo element shaft 34 and close high temperature port 136. At the same time, low temperature port 135 interlocked with thermo element 134 opens.

That is, thermo valve 30 is a mechanically controlled thermo valve for controlling flow amounts of a liquid for two input lines and one output line using expansion of a solid and a liquid. By implementing switching of passages for the two input lines with a lidded valve, problems of a sliding valve such as defective valve sliding due to an eccentric load of a hydraulic valve or a foreign material in oil and flow leakage from a clearance in the sliding valve can be substantially decreased.

Figure 3:
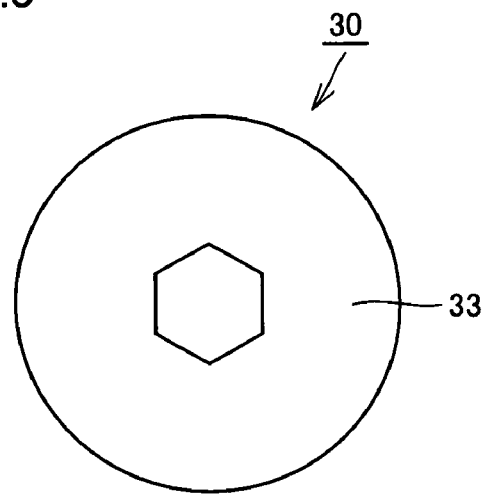
FIG. 3 is a front view of the thermo valve seen from a direction indicated with an arrow III in FIG. 2.

Referring to FIG. 3, thermo valve 30 has lid 33. Lid 33 has a circular form, and a nut-like region is provided in a central portion thereof.

Figure 4:
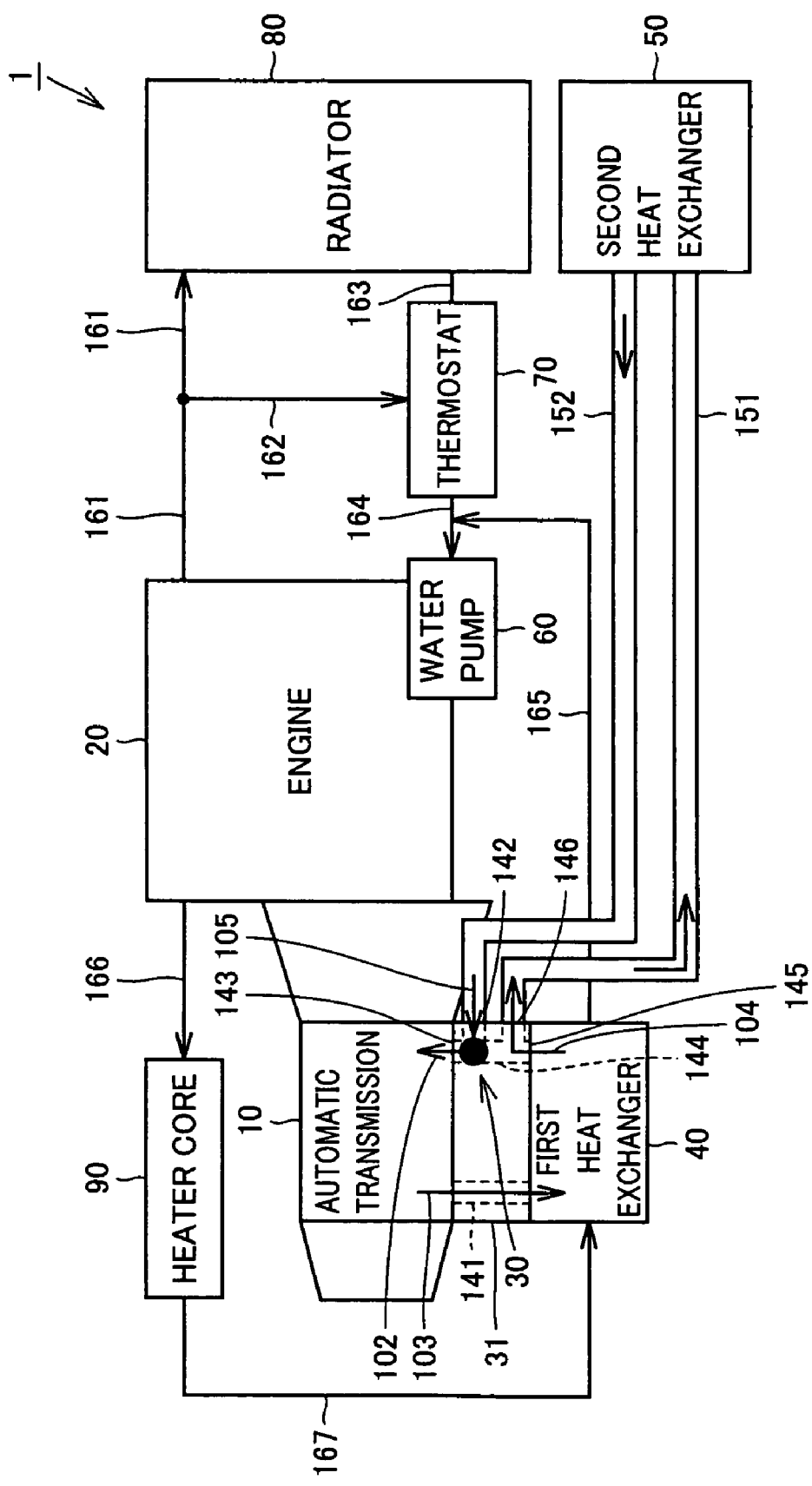
FIG. 4 is a block diagram of a heat exchanger structure of an automatic transmission at a high temperature.

Referring to FIG. 4, at a high temperature, thermo valve 30 allows oil output from first heat exchanger 40 to flow into second heat exchanger 50 via oil passage 151, as indicated with an arrow 104. In second heat exchanger 50, oil is cooled with outside air. Cooled oil flows toward thermo valve 30 via oil passage 152, as indicated with an arrow 105. Thereafter, the cooled oil flows into automatic transmission 10 via thermo valve 30.

Figure 5:
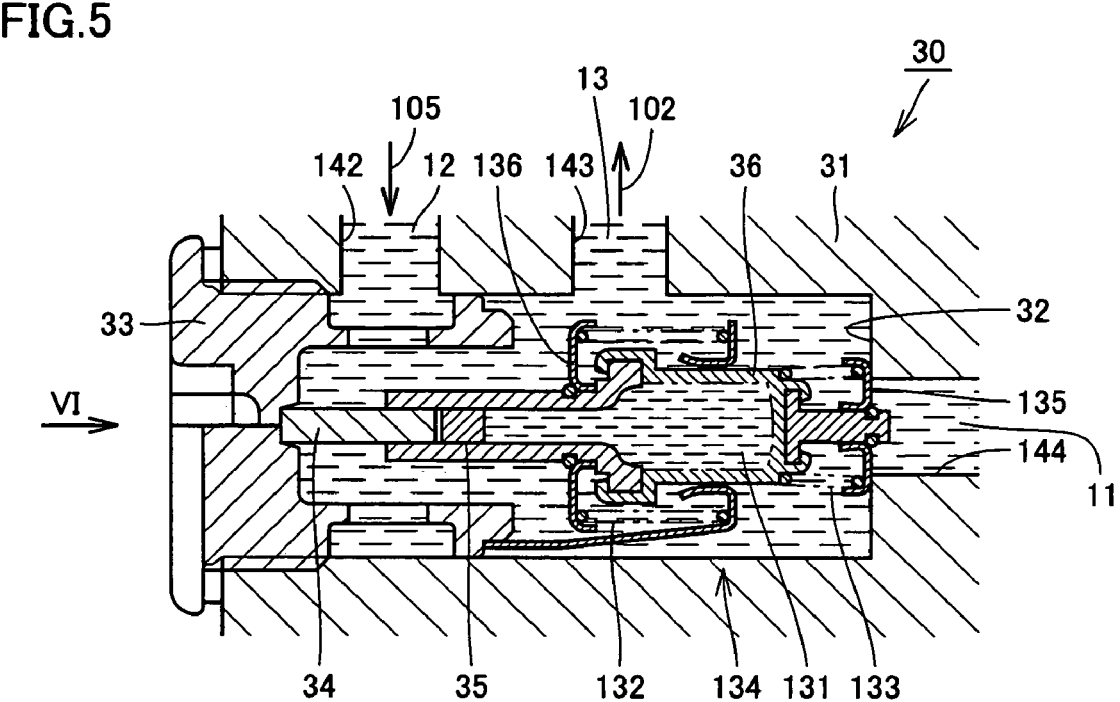
FIG. 5 is a detailed cross-sectional view of a thermo valve shown in FIG. 4.
Figure 6:
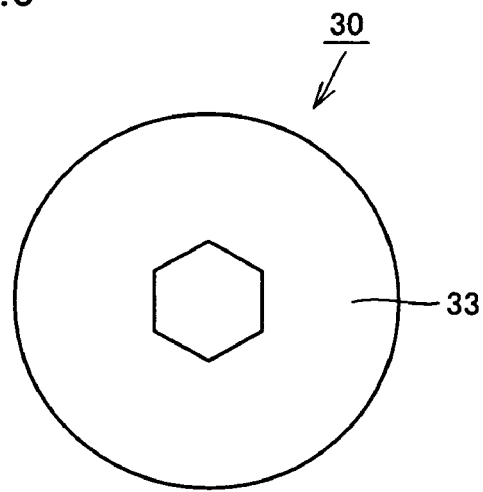
FIG. 6 is a front view of the thermo valve seen from a direction indicated with an arrow VI in FIG. 5.

Referring to FIGS. 5 and 6, when a temperature of oil 11 becomes high, wax 131 in thermo element 134 expands. With this, thermo element shaft 34 protrudes from cylinder 36. As a result, thermo element 134 moves toward input port 144, and low temperature port 135 seals input port 144. In addition, high temperature port 136 opens input port 142. With this, oil 12 enters from input port 142 in a direction indicated with arrow 105, and oil 13 is ejected from output port 143 in a direction indicated with an arrow 102. The oil is introduced into automatic transmission 10. It is to be noted that, when the oil has a middle temperature, states shown in FIGS. 2 and 5 are alternately repeated with a small stroke to stabilize a temperature of oil 13.

Thermo valve case 31 is arranged between automatic transmission 10 and first heat exchanger 40, and these three parts are connected without piping. An O ring or the like is preferably provided among these three parts to prevent oil leakage. Thermo valve case 31 is formed integrally with thermo valve 30, and is formed with three lines of input ports and three lines of output ports for oil.

Heat exchanger structure 1 of an automatic transmission according to the present invention includes automatic transmission 10, first heat exchanger 40 provided on an upstream side and second heat exchanger 50 provided on a downstream side, each capable of cooling oil ejected from automatic transmission 10, and thermo valve 30 capable of supplying oil cooled by at least one of first and second heat exchangers 40, 50 to automatic transmission 10. When a temperature of the oil is relatively low, thermo valve 30 supplies oil 11 passed through first heat exchanger 40 to automatic transmission 10 and shuts off a flow of oil 12 from second heat exchanger 50 to automatic transmission 10. When a temperature of the oil is relatively high, thermo valve 30 supplies oil 12 passed through first and second heat exchangers 40, 50 to automatic transmission 10.

Thermo valve 30 shuts off a flow of oil 12 from second heat exchanger 50 toward thermo valve 30 when a temperature of the oil is relatively low, and shuts off a flow of the oil from first heat exchanger 40 through thermo valve 30 toward automatic transmission 10 when the temperature of the oil is relatively high.

Oil 13 ejected from thermo valve 30 is supplied to automatic transmission 10 without being cooled by the heat exchanger.

When the oil temperature is low, thermo valve 30 forms a circuit to let the oil passing through first heat exchanger 40 return to automatic transmission 10, as shown in FIG. 1. The temperature of the oil of automatic transmission 10 is rapidly increased to a normal operation temperature with heat of water of the engine, and thereby an oil temperature for starting control such as lockup is reached in a shorter time. In addition, since an oil temperature is increased, a time of using the oil in a low viscosity range is increased and thus fuel consumption is increased. Furthermore, decrease in a transmission shock is implemented.

When a temperature of the oil is high, that is, at a high oil temperature, thermo valve 30 forms a circuit to let the oil passing through first heat exchanger 40 flow through second heat exchanger 50 and return to automatic transmission 10, as shown in FIG. 4. The oil of automatic transmission 10 is cooled to at most an upper limit temperature by first and second heat exchangers 40, 50.

At a middle temperature, operations of thermo valve 30 at a low oil temperature and a high oil temperature are alternately repeated with a small stroke to keep a constant temperature at the inlet of automatic transmission 10, which can attain a stable transmission performance.

In the heat exchanger structure of the automatic transmission constructed as such, a temperature of the oil is stabilized by arranging thermo valve 30 on an inlet side of the automatic transmission. That is, since thermo valve 30 is arranged on the inlet of the automatic transmission and a mixed temperature from first and second heat exchangers 40, 50 is set as an inlet temperature, an undershoot or an overshoot of the temperature of the oil becomes smaller as compared with a temperature control at an outlet. As a result, a delay in response is eliminated and a target temperature can be attained in a short time.

Furthermore, a cooling ability can be ensured concomitantly with increased fuel consumption. More specifically, an oil temperature for starting control such as lockup is reached in a shorter time by rapidly increasing the oil temperature. In addition, since an oil temperature is increased, a time of using the oil in a low viscosity range is increased and thus fuel consumption is increased.

It is to be noted that, though thermo valve case 31 and first heat exchanger 40 are arranged directly on a body of automatic transmission 10 in a construction shown in the first embodiment, thermo valve case 31 and first heat exchanger 40 may be arranged separately and connected by piping.

In addition, since low temperature port 135 and high temperature port 136 are interlocked with thermo element 134 in the structure in the first embodiment, a fail mode in which both valves are concurrently closed can be avoided.

Second Embodiment

Figure 7:
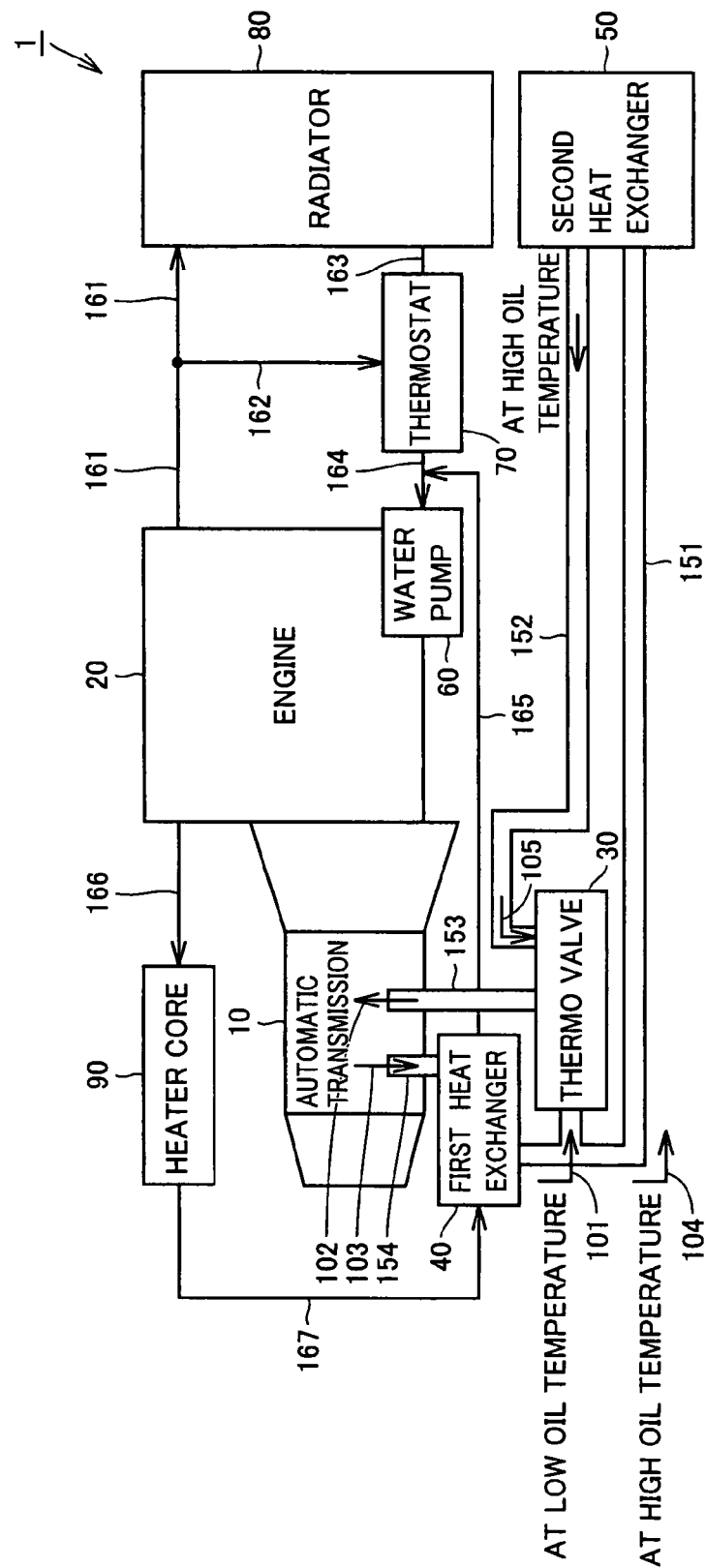
FIG. 7 is a block diagram of a heat exchanger structure of an automatic transmission according to a second embodiment of the present invention.

Referring to FIG. 7, a heat exchanger structure of an automatic transmission according to a second embodiment of the present invention is different from the structure according to the first embodiment in that, thermo valve 30 and first heat exchanger 40 are provided separately from automatic transmission 10. That is, thermo valve 30 is connected to automatic transmission 10 with an oil passage 153, and first heat exchanger 40 is connected to automatic transmission 10 with an oil passage 154.

The heat exchanger structure of an automatic transmission according to the second embodiment constructed as such also has effects similar to that of the heat exchanger structure according to the first embodiment.

Third Embodiment

Figure 8:
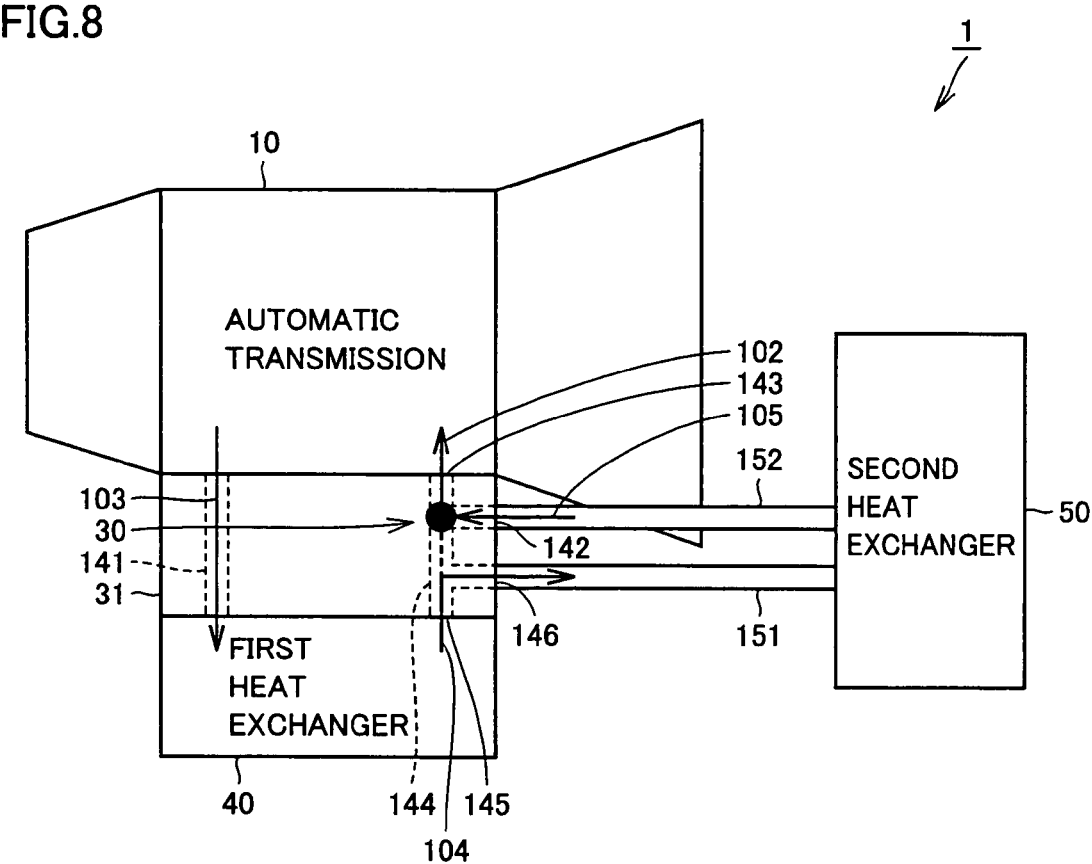
FIG. 8 is a block diagram of a heat exchanger structure of an automatic transmission according to a third embodiment of the present invention.

Referring to FIG. 8, a heat exchanger structure of an automatic transmission according to a third embodiment of the present invention is different from the structure according to the first embodiment in that, heater core 90, water pump 60, thermostat 70, and radiator 80 shown in the first embodiment are not provided. Both of first and second heat exchangers 40, 50 can exchange heat with outside air. It is to be noted that, first and second heat exchangers 40, 50 may be cooled by spraying water onto the heat exchangers 40, 50.

The heat exchanger structure of an automatic transmission according to the third embodiment constructed as such also has effects similar to that of the structure according to the first embodiment.

Various modifications of the embodiments of the present invention described above are possible. First, the present invention can be applied not only to an automobile of a so-called length side type in which automatic transmission 10 is arranged orthogonal to an axle, but also to a so-called transverse type in which the automatic transmission is arranged in parallel to the axle.

In addition, second heat exchanger 50 may be provided in any portion inside an engine compartment. Furthermore, second heat exchanger 50 may be provided so as to contact with radiator 80. Second heat exchanger 50 may also be integrated with radiator 80 to exchange heat with cooling water of radiator 80.

Although the present invention has been described and illustrated in detail, it is clearly understood that the same is by way of illustration and example only and is not to be taken by way of limitation, the spirit and scope of the present invention being limited only by the terms of the appended claims.

The present invention can be applied in a field of an automatic transmission mounted on an automobile.

What is claimed is:

1. A heat exchanger structure of an automatic transmission, comprising:
an automatic transmission;
a first heat exchanger provided upstream from a second heat exchanger, relative to a flow direction of oil ejected from the automatic transmission, each capable of exchanging heat of oil ejected from said automatic transmission;
a thermo valve case positioned between and contacting both of the automatic transmission and the first heat exchanger; and
a thermo valve within the thermo valve case capable of supplying oil subject to heat exchange by at least one of said first heat exchanger and said second heat exchanger to said automatic transmission, the thermo valve having first and second thermo valve input ports, the first thermo valve input port receiving oil from the first heat exchanger and the second thermo valve input port receiving oil from the second heat exchanger, the thermo valve further having a thermo valve output port outputting oil to the automatic transmission,
wherein the thermo valve is provided such that the oil passes from the automatic transmission through one or both heat exchangers without first passing through, or contacting, the thermo valve,
any oil ejected from the thermo valve output port is not further cooled by either or both heat exchangers before passing through the automatic transmission,
the heat exchanger has two systems for cooling oil, a first system including the thermo valve, the first thermo valve input port, and the first heat exchanger, and a second system including the thermo valve, the second thermo valve input port, and the second heat exchanger;
when a temperature of the oil is at most a predetermined value, said thermo valve supplies oil passed through said first heat exchanger to said automatic transmission and shuts off a flow of said oil from said second heat exchanger to said automatic transmission; and
when a temperature of the oil exceeds the predetermined value, said thermo valve supplies oil passed through said first heat exchanger and said second heat exchanger to said automatic transmission.

2. The heat exchanger structure of an automatic transmission according to claim 1, wherein
said thermo valve shuts off a flow of the oil from said second heat exchanger toward said thermo valve when a temperature of the oil is at most the predetermined value, and shuts off a flow of the oil from said first heat exchanger toward said thermo valve when a temperature of the oil exceeds the predetermined value.

3. The heat exchanger structure of claim 1,
wherein the first heat exchanger has a first heat exchanger output port;
the second heat exchanger has a second heat exchanger input port; and
the first thermo valve input port is fluidically connected to the first heat exchanger output port and the second heat exchanger input port.

4. The heat exchanger structure of claim 1, wherein the thermo valve comprises:
   a thermo valve housing having:
      a space,
      the first thermo valve input port communicating with the space,
      the second thermo valve input port communicating with the space, and
      the thermo valve output port communicating with the space;
   a shaft within the space and fixed to an internal wall of the thermo valve housing;
   a valve element slidably mounted on the shaft;
   a heat-sensitive medium disposed within the valve element and operatively in contact with the shaft, the heat-sensitive medium having a volume which varies with temperature; and
   an elastic means connected between the valve element and the thermo valve housing,
   wherein the volume of the heat-sensitive medium determines a position of the valve element on the shaft, the position of the valve element determines which of the first thermo valve input port, the second thermo valve input port, and both the first and second thermo valve input ports is in fluidic communication with the thermo valve output port, and
   wherein the elastic means acts on the valve element in opposition to the action of the heat-sensitive medium on the valve element.

5. The heat exchanger structure of claim 1, wherein the first heat exchanger is an oil-to-water heat exchanger.

6. A heat exchanger structure of an automatic transmission, comprising:
   an automatic transmission;
   a first heat exchanger and a second heat exchanger each capable of exchanging heat of oil ejected from said automatic transmission; a thermo valve case positioned between and contacting both of the automatic transmission and the first heat exchanger; and
   a thermo valve provided in the thermo valve case capable of supplying oil subject to heat exchange by at least one of said first heat exchanger and said second heat exchanger to said automatic transmission, the thermo valve having first and second thermo valve input ports, the first thermo valve input port receiving oil from the first heat exchanger and the second thermo valve input port receiving oil from the second heat exchanger, the thermo valve further having a thermo valve output port outputting oil to the automatic transmission,
   wherein the heat exchanger has two systems for cooling oil, a first system including the thermo valve, the first thermo valve input port, and the first heat exchanger, and a second system including the thermo valve, the second thermo valve input port, and the second heat exchanger,
   any oil ejected from the thermo valve output port is not further cooled with either of said first or second heat exchangers before passing through the automatic transmission,
   said thermo valve is arranged at an inlet of said automatic transmission,
   the first heat exchanger has a first heat exchanger output port,
   the second heat exchanger has a second heat exchanger input port, and
   the first thermo valve input port is fluidically connected to the first heat exchanger output port and the second heat exchanger input port.

7. The heat exchanger structure of claim 6, wherein the thermo valve comprises:
   a thermo valve housing having:
      a space,
      the first thermo valve input port communicating with the space,
      the second thermo valve input port communicating with the space, and
      the thermo valve output port communicating with the space;
   a shaft within the space and fixed to an internal wall of the thermo valve housing;
   a valve element slidably mounted on the shaft;
   a heat-sensitive medium disposed within the valve element and operatively in contact with the shaft, the heat-sensitive medium having a volume which varies with temperature; and
   an elastic means connected between the valve element and the thermo valve housing,
   wherein the volume of the heat-sensitive medium determines a position of the valve element on the shaft, the position of the valve element determines which of the first thermo valve input port, the second thermo valve input port, and both the first and second thermo valve input ports is in fluidic communication with the thermo valve output port, and
   wherein the elastic means acts on the valve element in opposition to the action of the heat-sensitive medium on the valve element.

8. The heat exchanger structure of claim 6, wherein
the first heat exchanger is an oil-to-water heat exchanger.

9. A heat exchanger structure of an automatic transmission, comprising:
   an automatic transmission;
   a first heat exchanger and a second heat exchanger each capable of exchanging heat of oil ejected from said automatic transmission;
   a thermo valve case positioned between and contacting both of the automatic transmission and the first heat exchanger; and
   a thermo valve capable of supplying oil subject to heat exchange by at least one of said first heat exchanger and said second heat exchanger to said automatic transmission, the thermo valve having first and second thermo valve input ports, the first thermo valve input port receiving oil from the first heat exchanger and the second thermo valve input port receiving oil from the second heat exchanger, the thermo valve further having a thermo valve output port outputting oil to the automatic transmission,
   wherein the heat exchanger has two systems for cooling oil, a first system including the thermo valve, the first thermo valve input port, and the first heat exchanger, and a second system including the thermo valve, the second thermo valve input port, and the second heat exchanger,
   any oil ejected from the thermo valve output port is not further cooled with either of said first or second heat exchangers before passing into the automatic transmission, and is supplied to said automatic transmission without being mixed with the oil cooled with said first and second heat exchangers,
   the first heat exchanger has a first heat exchanger output port, the second heat exchanger has a second heat exchanger input port, and the first thermo valve input port is fluidically connected to the first heat exchanger output port and the second heat exchanger input port.

10. The heat exchanger structure of claim 9, wherein the thermo valve comprises:

a thermo valve housing having:
- a space,
- the first thermo valve input port communicating with the space,
- the second thermo valve input port communicating with the space, and
- the thermo valve output port communicating with the space;

a shaft within the space and fixed to an internal wall of the thermo valve housing;

a valve element slidably mounted on the shaft;

a heat-sensitive medium disposed within the valve element and operatively in contact with the shaft, the heat-sensitive medium having a volume which varies with temperature; and an elastic means connected between the valve element and the thermo valve housing, wherein the volume of the heat-sensitive medium determines a position of the valve element on the shaft, the position of the valve element determines which of the first thermo valve input port, the second thermo valve input port, and both the first and second thermo valve input ports is in fluidic communication with the thermo valve output port, and wherein the elastic means acts on the valve element in opposition to the action of the heat-sensitive medium on the valve element.

11. The heat exchanger structure of claim 9, wherein the first heat exchanger is an oil-to-water heat exchanger.

* * * * *